US 6,313,591 B1

(12) United States Patent
Welker et al.

(10) Patent No.: US 6,313,591 B1
(45) Date of Patent: Nov. 6, 2001

(54) DELAY TIME MODELING FILTER FOR CASCADED REGULATOR STRUCTURE

(75) Inventors: Johannes Welker, Neumarkt; Guido Seeger, Baiersdorf, both of (DE)

(73) Assignee: Siemens Aktiengesellschaft (DE)

( * ) Notice: Subject to any disclaimer, the term of this patent is extended or adjusted under 35 U.S.C. 154(b) by 0 days.

(21) Appl. No.: 09/506,312

(22) Filed: Feb. 17, 2000

(51) Int. Cl.[7] ............... H02P 1/54; H02P 5/46; H02P 7/68; H02P 7/74; H02P 7/80

(52) U.S. Cl. .................. 318/34; 318/39; 318/67; 318/49; 318/571; 318/615

(58) Field of Search .................. 318/34, 39, 49, 318/59, 61, 62, 64, 67, 268, 271, 570, 571, 573, 574, 611, 615, 609, 610; 323/265, 268, 270, 280

(56) References Cited

U.S. PATENT DOCUMENTS

| 4,914,365 | * | 4/1990 | Murakami et al. | 318/609 |
| 5,256,944 | * | 10/1993 | Tobise et al. | 318/799 |
| 5,589,748 | * | 12/1996 | Kazama et al. | 318/560 |
| 5,751,585 | * | 5/1998 | Cutler et al. | 364/474.03 |
| 5,952,804 | * | 9/1999 | Hamamura et al. | 318/560 |

FOREIGN PATENT DOCUMENTS

| 0534690-A2 | * | 3/1993 | (EP) | 318/560 |
| 03040008-A | * | 2/1991 | (JP) | 340/685 |

* cited by examiner

Primary Examiner—Jeffrey Donels
Assistant Examiner—Edgardo San Martin
(74) Attorney, Agent, or Firm—Foley & Lardner

(57) ABSTRACT

A control system controls the movement of an object based on desired position data. The control system includes a first regulator configured to regulate the position of the object, a feed forward control configured to feed the desired position data forward to a second regulator at a lower level than the first regulator, and a modeling filter configured to receive the desired position data and to provide the desired position data to the first regulator with a predetermined time delay.

22 Claims, 5 Drawing Sheets

DELAY TIME MODELING FILTER FOR CASCADED REGULATOR STRUCTURE

FIELD OF THE INVENTION

The present invention relates generally to control systems for drives (e.g., electronic drives, hydraulic drives, etc.). More specifically, the present invention relates to control systems for drives having a cascaded regulator structure.

BACKGROUND OF THE INVENTION

Drives require precise positioning response and contour-forming response. To operate a drive, an operator first writes a part program describing parts, speeds, etc. Next, during a preparation step, the part program is compiled. Then, during an interpolation step, the compiled program is interpolated to generate time critical contour, milling and turning points called desired position data. Typically, the desired position data are fed to a cascaded regulator structure having control loops for current regulation, speed regulation and position regulation. A cascaded regulator structure receives the desired position data and passes the desired position data through each of the control loops to control the position of the drive.

It is preferable in a cascaded regulator structure to control the position of the drive with the lower-level control loops (e.g., the current regulator and speed regulator) and not with the position regulator since the response time of the position regulator (e.g., about 10 to 60 milliseconds) is much longer than the response times of the speed regulator (e.g., about 1 to 2 milliseconds) and current regulator (e.g., about 0.2 milliseconds). The position regulator is preferably used for the disturbance response of the system, not the position response.

Therefore, it is known to provide a feed forward control path to feed the desired position data past the position regulator to the speed regulator. Likewise, a feed forward control path may be provided to feed the desired position data past the position regulator to the current regulator. Feeding forward the position data reduces the reaction time of the system (i.e., the time between when a desired position is received and when the drive reaches the desired position). As a result, a narrower contour can be achieved with the system. However, feeding forward also causes overshoot of the desired position, which is unacceptable. Overshoot occurs since the desired position data is provided to the position regulator as well as to the lower-level regulators, resulting in a combined response at the drive.

To reduce overshoot, a modeling filter has been employed between the desired position data and the position regulator. The modeling filter attempts to cleanly model the delay between the actual position of the drive and the desired position of the drive so that, ideally, no difference between delayed desired position and actual (i.e., measured) position is fed to the position regulator, such that the position regulator does not cause the overshoot. The delay which must be modeled is caused by the feed forward paths, the lower-level control loops and the mechanical components of the drive.

A low pass filter has been used as the modeling filter, whose time constant is set to the dominant equivalent time constant of the rest of the control loop (i.e., the time constant of the speed regulator in this example), in an attempt to model the delay. However, the effectiveness of the low pass filter is dependent upon the speed of the drive. For example, for a given time constant, low drive speeds may result in a slight undershoot (for example, at the corner of a workpiece) while higher drive speeds may result in a slight overshoot. Thus, one option is to adjust the time constant to prevent overshoots. However, this option does not cleanly model the delay (i.e., the position regulator is still contributing to the position response) and, therefore, position response is slower than desirable. Another option is to set the time constant for a slight overshoot and reduce the magnitude of the overshoots by using additional desired position data. However, this option is too slow and requires more computation during the interpolation step.

Yet another option is to use a speed regulator with a reference model instead of a proportional integral response. The reference model uses an additional filter in front of the integrator of the proportional-integral speed regulator. This option makes the speed regulator faster and eases feedforward adjustment, but tuning the speed regulator is difficult and requires more knowledge of the mechanical dynamics of the system. Still another option is to use higher order filters (e.g., including a second or third order time constant). However, the higher the order of the filter used, the greater the computation time and complexity.

Therefore, what is needed is a system and method for controlling an object with improved accuracy. Further what is needed is an improved system and method for modeling the actual position of a controlled object. Such an improved system and method would allow for improved accuracy in position response on contours. Also, the improved system and method would avoid the need to accept a compromise of undershoots and overshoots, as with the low pass filter described above. Further still, the improved system and method would be more easily adjustable than prior systems.

SUMMARY OF THE INVENTION

According to one exemplary embodiment, a control system is disclosed for controlling the movement of an object based on desired position data. The control system includes a first regulator configured to regulate the position of the object, a feed forward control configured to feed the desired position data forward to a second regulator at a lower level than the first regulator, and a modeling filter configured to receive the desired position data and to provide the desired position data to the first regulator with a predetermined time delay.

According to another exemplary embodiment, a method of regulating the movement of an object using a cascaded regulator structure is disclosed. The cascaded regulator structure has a position regulator and a speed regulator. The method includes speed regulating the movement of the object based on the desired position data, and position regulating the movement of the object based on delayed desired position data which has been delayed by a predetermined time delay.

According to yet another exemplary embodiment, an apparatus is disclosed for regulating the movement of an object using a cascaded regulator structure. The apparatus includes means for speed regulating the movement of the object based on the desired position data, and means for position regulating the movement of the object based on delayed desired position data which has been delayed by a predetermined time delay.

According to still another exemplary embodiment, a machine tool for controlling the movement of a tool with respect to a workpiece based on desired position data is disclosed. The machine tool includes a table configured to hold the workpiece, a first motor configured to move one of the table and the tool, a second motor configured to move one of the table and the tool, and a controller configured to operate the first and second motors. The controller includes a first regulator configured to regulate the position of the first motor, a feed forward control configured to feed the desired position data forward to a second regulator at a lower level than the first regulator, and a modeling filter configured to receive the desired position data and to provide the desired position data to the first regulator with a predetermined time delay.

DETAILED DESCRIPTION OF EXEMPLARY EMBODIMENTS

Figure 1:
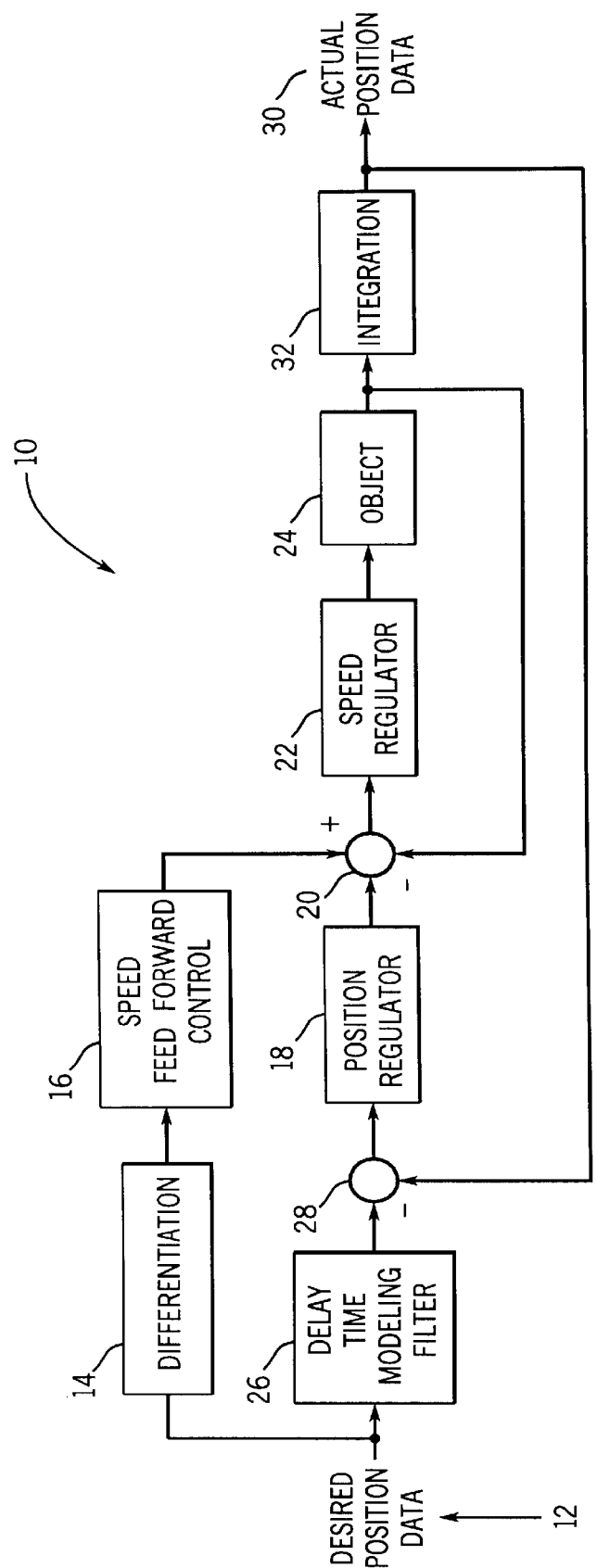
FIG. 1 depicts a block diagram of a control flow according to an exemplary embodiment.

Referring first to FIG. 1, a control flow according to an exemplary embodiment is shown. The control flow is implemented in software on a computer, workstation or other controller, but may alternatively be implemented using discrete circuit components or other computational devices known to those of ordinary skill in the art. For example, the control flow may be implemented on the Simodrive 611D or 611U, manufactured by Siemens AG, Munich, Germany.

FIG. 1 discloses a control system and method 10 for controlling an object (e.g., an electronic drive, motor, etc.) with improved accuracy, particularly on highly kinked or contoured surfaces. Desired position data 12 are generated by interpolating a compiled part program which is created by an operator for a desired task. For example, the Sinumerik 840D, also manufactured by Siemens AG, performs the steps of compiling the part program and then interpolating the contour, milling and turning points in a point-to-point manner. These points become desired position data 12. Alternatively, desired position data 12 may be generated by other systems and methods.

Desired position data 12 are provided through a differentiation step 14 to generate desired speed data. Alternatively, desired speed data may be generated by the interpolating step for each set of desired position data (e.g., for each axis of the drive system) in which case differentiation step 14 is not necessary in system 10. The desired speed data is provided to the speed feed forward control 16 which feeds the desired speed data past a position regulator 18 to mixer 20 where it is summed with the output data from position regulator 18. The output of mixer 20 is provided to a speed regulator 22. In this way, speed regulator 22 controls an object 24 (e.g., a drive, motor, etc.) with improved position response. A position sensor (e.g., an optical or magnetic positions sensor) is used to measure the actual position of object 24 and to generate actual position data 30, which is fed back to a mixer 28. Actual speed is derived from the actual position and is fed back to mixer 20. Thus, integration step 32 is not necessarily a computation step, but could be in an alternative embodiment.

However, since mixer 20 also sums the output data from position regulator 18, to avoid overshoot caused by position regulator 18 contributing to the position response, a delay time modeling filter 26 is utilized between desired position data 12 and position regulator 18. Delay time modeling filter 26 is configured to receive desired position data 12 and delay the subsequent transmission of data 12 to position regulator 18 by a predetermined time period (i.e., a time constant, Td). Each of data 12 is delayed by the predetermined time period and then provided to mixer 28. Mixer 28 subtracts actual position data 30 representative of the actual position of object 24. The predetermined time period is set to equal the delay caused by the feed forward control 16, speed regulator 22 (and a current regulator, if applicable) and the mechanical components of object 24. When the predetermined time period is set in this manner, the difference at mixer 28 between the delayed desired position data and actual position data 30 will be approximately zero, and position regulator 18 will not contribute to the position response of the control system.

In some applications, for example for drives for larger machines, the response times of the various control loops are longer. In these larger machines, the modeling filter may advantageously include a combination of a low pass filtering and delay time filtering.

Figure 2A:
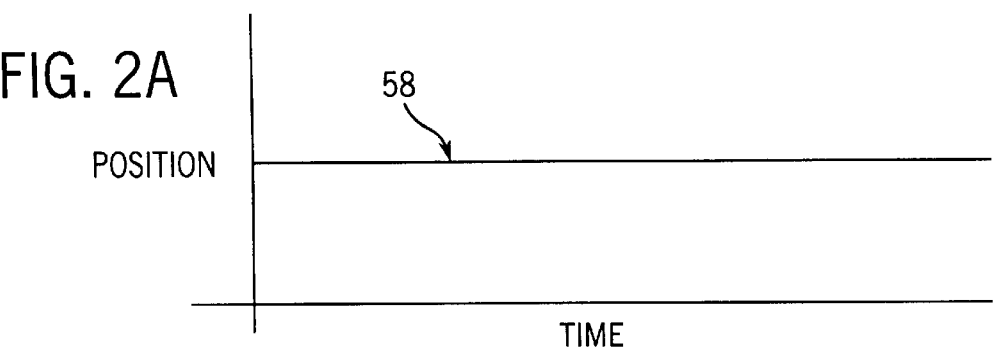
FIGS. 2A–2D depict position versus time diagrams for a desired position (FIG. 2A), a feed forward response (FIG. 2B), a feed forward response with low pass filter (FIG. 2C), and a feed forward response with delay time modeling filter (FIG. 2D)
Figure 2B:
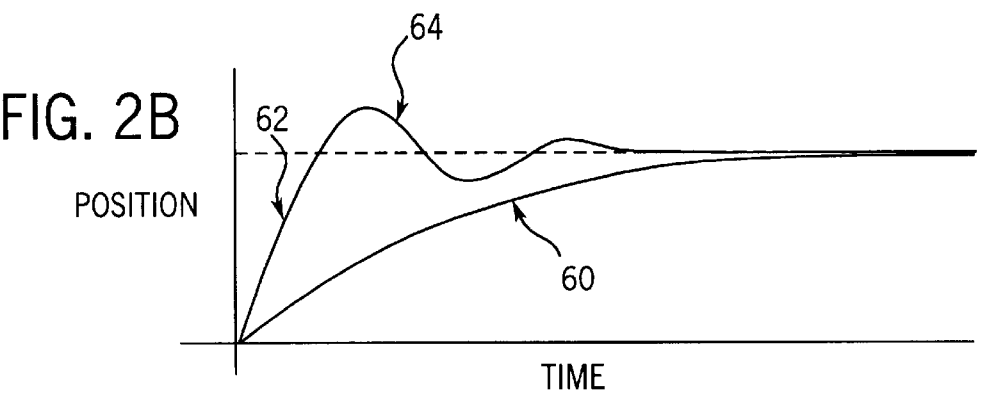
Figure 2C:
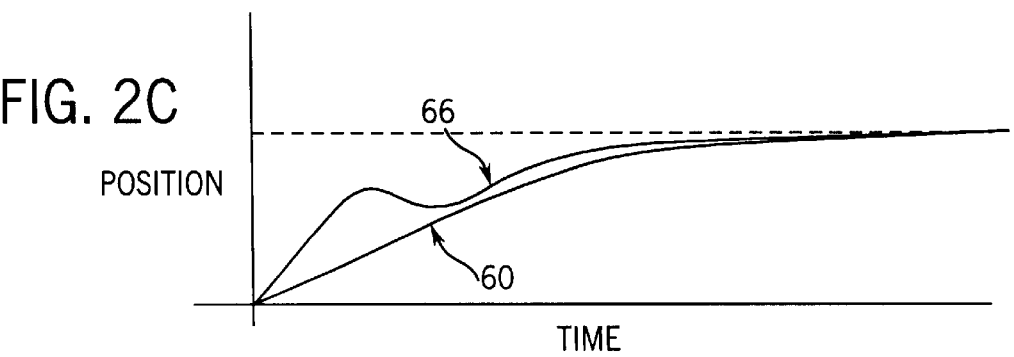
Figure 2D:
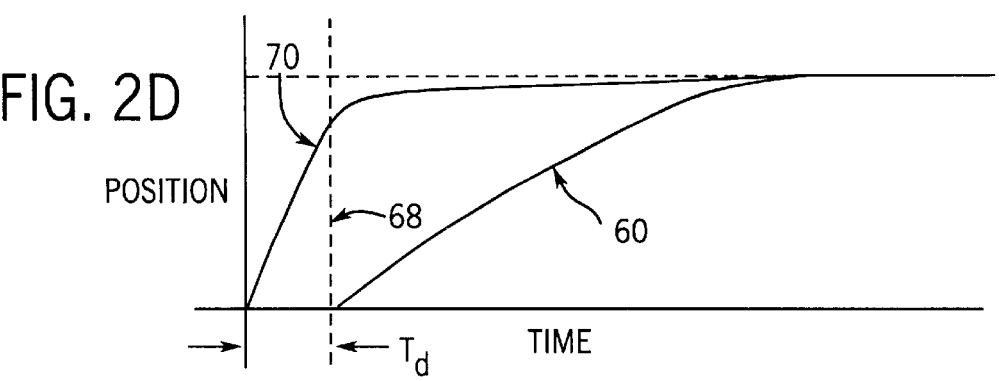

FIGS. 2A–2D illustrate the improved position response capable with the delay time modeling filter. FIG. 2A illustrates a desired position 58. FIG. 2B illustrates the expected results of a system having a feed forward control without a modeling filter. The position regulator contributes the response indicated at 60, which approaches the desired position at a slow rate. The actual position of the object is shown at 62. An overshoot is indicated at 64, which is unacceptable. FIG. 2C illustrates the expected results of a system having a low pass filter for a modeling circuit according to the prior art. The actual position of the object is shown at 66. In this example, the time constant of the low pass filter has been adjusted to reduce overshoot, but it can be seen that the object reaches the desired position rather slowly. FIG. 2D illustrates the expected results of a system having a delay time modeling circuit according to the exemplary embodiment of FIG. 1. The predetermined time period is represented by 68 and Td. Thus, position regulator 18 does not contribute to the position response until this time. Advantageously, by the time position regulator 18 receives desired position data 12 from delay time modeling filter 26, the lower level control loops (e.g., speed regulator 22 ) have already provided most of the position response to move the actual position of object 24 near the desired position, as shown at 70. Thus, it can be seen that delay time modeling filter 26 improves response time and greatly reduces overshoot, improving the position response of the control system, particularly on contours. Also, it can be seen that there is no longer a need to accept undershoots when reducing overshoot as was the situation with the low pass filter.

A further advantage of delay time modeling filter 26 over the low pass filter relates to the time during which no additional desired position data 12 is received. When no additional desired position data 12 is received, position regulator 18 should alone control the positioning at the destination point (i.e., without contributions from the lower level regulators). In the low pass filter system, if the low pass filter has not yet completely deduced the destination position at the time when no additional desired position data is received, it is also not yet possible for the position regulator to control the disturbance response. With delay time modeling filter 26, the destination position is known at the output of filter 26 once the predetermined delay time has expired, so position regulator 18 can move object 24 more quickly to the destination than when using the low pass balancing filter.

According to a further improvement, the predetermined time period of delay time modeling filter 26 is adjustable in steps finer than the steps between desired position data 12. This improvement allows for increased effectiveness of delay time modeling filter 26. For example, in one exemplary system, desired position data 12 are received every 10 milliseconds and the response time of speed regulator 22 is on the order of 1–2 milliseconds. In this system, it would be advantageous to output the delayed desired position data every 1–2 milliseconds or less instead of every 10 milliseconds. One method of accomplishing this is to interpolate between desired position data 12 stored in memory to generate additional data points according to the following equation:

$$y(t) = x(t0) + \frac{(x(t1) - x(t0))m}{k}; m = 0 \ldots k-1$$

where y(t) is the interpolated data point between x(t0) and x(t1), x(t0) is the desired position data point at time t0, x(t1) is the next desired position data point at time t1, k is the number of values we want to interpolate between, and m is the number of a single interpolated data point. The first interpolated data point (at m=0) corresponds to the first desired position data point, x(t0). Setting m=k results in y(t) equal to x(t1).

Other alternative methods of generating additional data points from desired position data 12 are contemplated. For example, other forms of interpolation (e.g., cubic interpolation) may be used instead of the interpolation method specified above. Alternatively, the additional data points may by generated by hardware interrupts, though this method requires complex hardware and software adaptations and would be limited by fine adjustment limits in a digital system. Also, alternative methods of calculation or measurement may be used to realize a finer adjustable delay time modeling filter.

Figure 3:
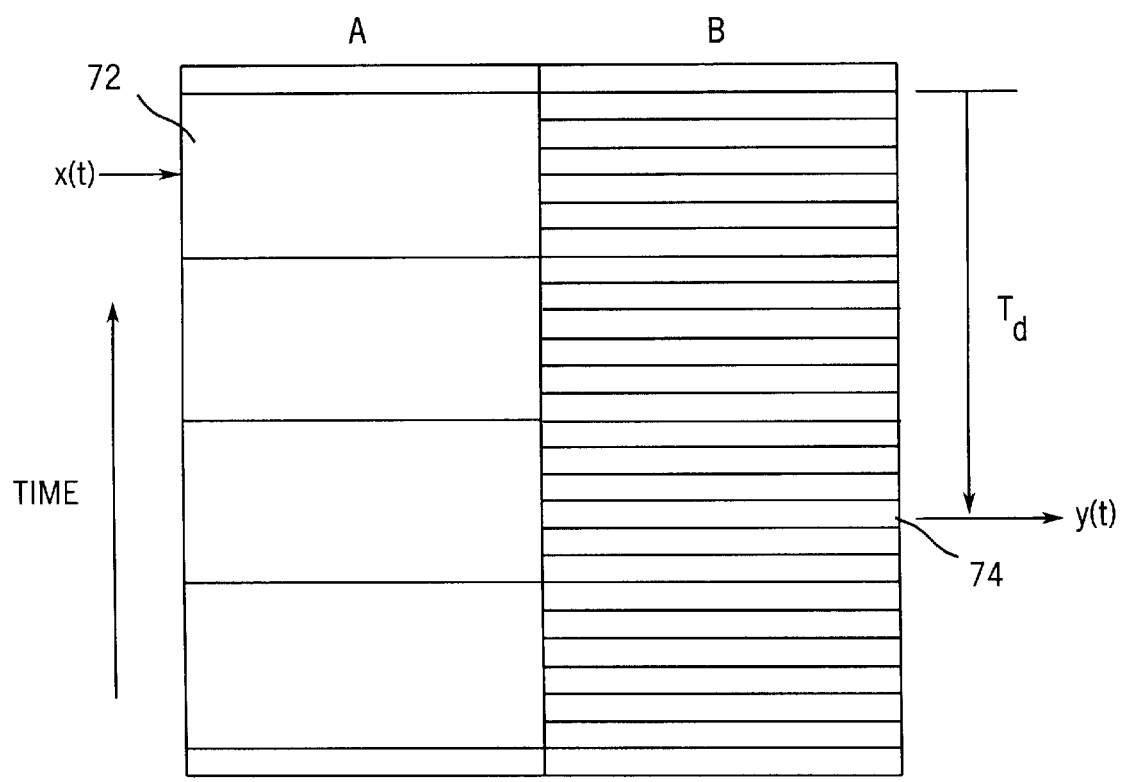
FIG. 3 depicts a table of desired positions stored in memory.

FIG. 3 discloses a table in memory (e.g., DRAM, SRAM, etc.) generated by delay time modeling filter 26. Time is represented by the height of each memory location in the diagram. A memory write to column A occurs each time a desired data point is received, as shown at memory location 72. The stored data in column A is then interpolated to increase the number of desired data points and written to column B. In this diagram, six data points in column B correspond to one data point in column A, though in alternative embodiments, the number of data points in column B corresponding to those in column A could be greater than or less than six. The predetermined time period of delay time modeling filter 26 is represented by Td. After time Td, a memory read of the data occurs from column B, such as shown at memory location 74, and the read data point is provided to position regulator 18.

As mentioned, the predetermined time period of delay time modeling filter 26 is set to equal the delay caused by the feed forward control 16, speed regulator 22 (and a current regulator, if applicable) and the mechanical components of object 24. The value of the predetermined time period can be determined in number of ways. The start value for the predetermined time period can be, for example, the time constant of speed regulator 22. This value can then be trimmed manually via an operator input device (e.g., a dial, a button, or a graphical user interface selector such as a drag bar on a video screen, etc.) or trimmed automatically by the software. Using the start value, object 24 is moved according to a calibration program. The actual positions are observed with great magnification to determine whether overshoots are observed or whether an excessively slow approach is observed. If overshoots are observed, the predetermined time period is increased. If an excessively slow approach is observed, the predetermined time period is decreased. The effect of adjusting the predetermined time period on position regulator 18 can be seen with reference to FIG. 2D. As predetermined time period (Td) is decreased, the contribution to the position response from position regulator 18 (indicated by line 60) is increased above 0% and the contribution to the position response from the lower level regulators is correspondingly decreased from 100%. Thus, Td should be set as short as possible, with the presence of overshoots during positioning governing the lower limit. This process can be automatically carried out by a delay time adjuster using the same process and constraints.

Figure 4:
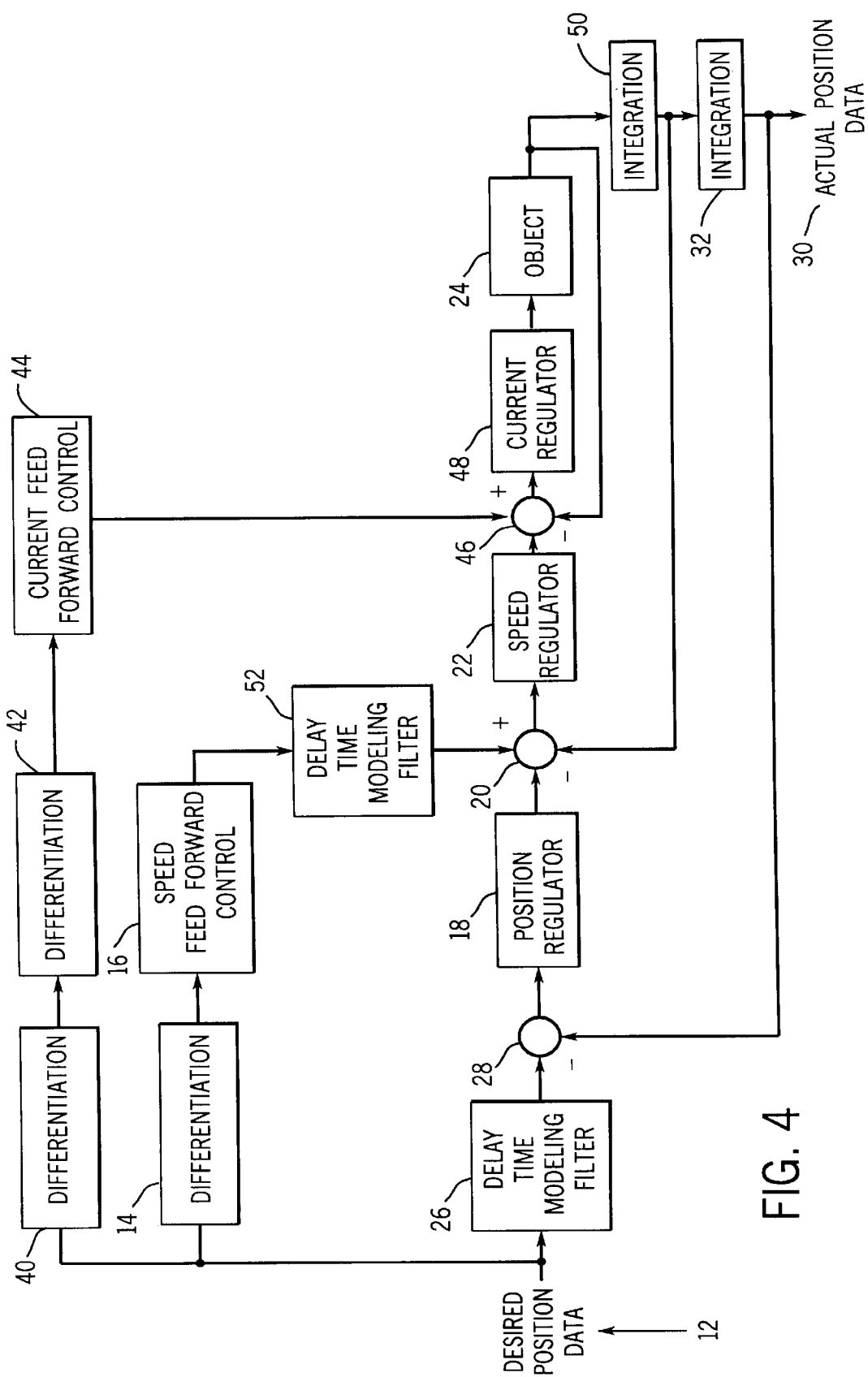
FIG. 4 depicts a block diagram of a control flow according to an alternative embodiment.

Referring now to FIG. 4, an alternative embodiment of the control flow of FIG. 1 will now be described. The control flow of FIG. 4 is similar to that of FIG. 1 except that a current feed forward control path and a current regulator are added. Specifically, desired position data 12 is provided through first and second differentiations 40, 42 to generate desired acceleration data which is then provided to a current feed forward control 44. A mixer 46 combines the current feed forward data with output data from speed regulator 22. Mixer 46 provides the combined data to a current regulator 48 which, in turn, drives object 24. The actual acceleration of object 24 is fed back to mixer 46. An integration step 50 integrates the actual acceleration data of object 24 to generate the actual speed data.

A second delay time modeling filter 52 is provided in this embodiment between speed feed forward control 16 and mixer 20. Delay time modeling filter 52 functions like delay time modeling filter 26 by delaying the transmission of data to speed regulator 22.

Figure 5:
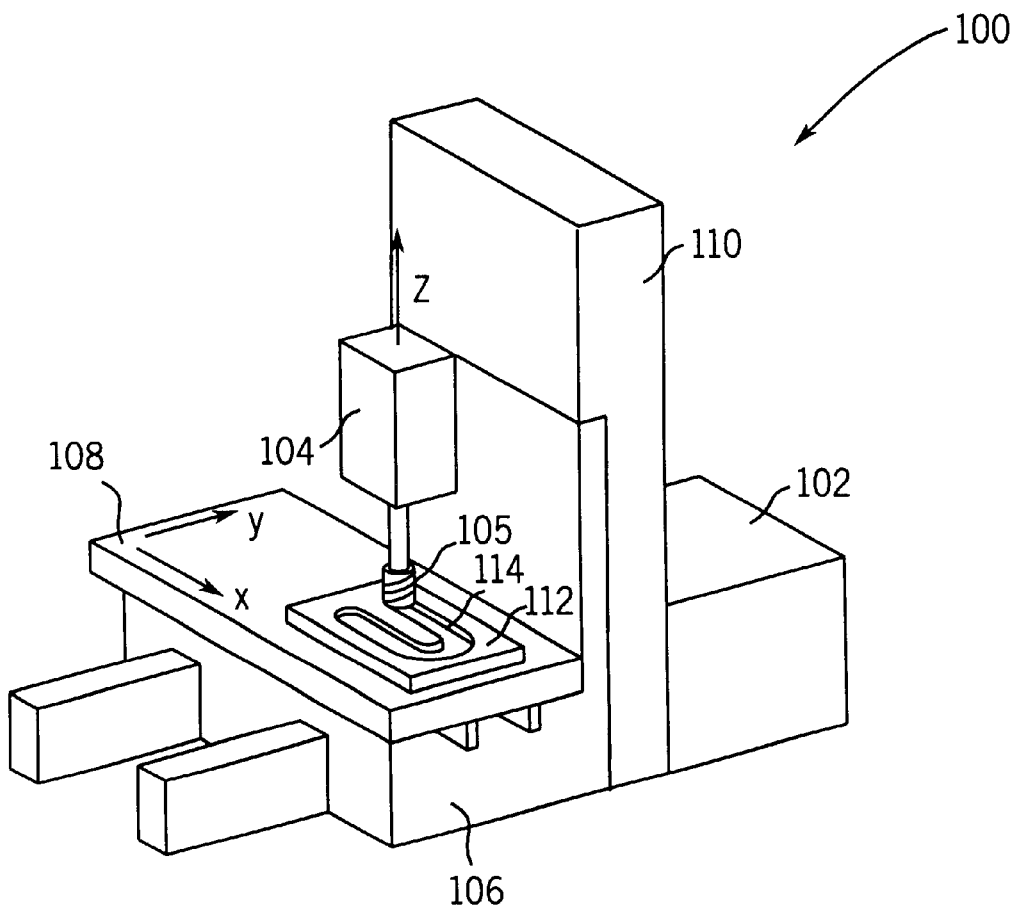
FIG. 5 depicts a machine tool according to an exemplary embodiment.

Referring now to FIG. 5, a machine tool 100 is shown according to an exemplary embodiment. Machine tool 100 is a three-axis material removal machine, but may alternatively be other types of machine tools (e.g., single axis, other multi-axis, forming machines, etc.). Machine tool 100 includes a numerical controller 102 configured to compile a part program and run an interpolation through the control flow of FIG. 1 or 4. Controller 102 provides control signals (e.g., either DC or AC signals) according to the control flow to drive various motors, including: a rotational motor in column 104 to rotate a cutting tool 105, an X-axis linear motor and a Y-axis linear motor in base 106 to move a table 108 in the X- and Y-directions, respectively, and a Z-axis linear motor in body 110 to move cutting tool 105 in the Z-direction. The motors are servomotors, but may alternatively be stepper motors, hydraulic actuators, pneumatic devices, or other motors used in machine tools. A workpiece 112 is affixed to table 108. Controller 102 operates the various motors according to the control flow to machine a contour 114 in workpiece 112. Controller 102 may also be programmed to machine point-to-point holes, straight-cut holes, etc., depending on the part program and the interpolation routine. Machine tool 100 further includes position sensors (not shown) at each motor configured to sense the position of the motor, to generate position feedback signals based thereon, and to provide the position feedback signals to controller 102.

While the embodiments illustrated in the FIGURES and described above are presently preferred, it should be understood that these embodiments are offered by way of example only. For example, various circuitry, controllers, software, user input devices, etc. may be employed to accomplish the control steps disclosed herein. The invention is not limited to a particular embodiment, but extends to various modifications that nevertheless fall within the scope of the appended claims.

What is claimed is:

1. A control system for controlling the movement of an object based on desired position data, comprising:
   a first regulator configured to regulate the position of the object;
   a feed forward control configured to feed the desired position data forward to a second regulator at a lower level than the first regulator;
   a modeling filter configured to receive the desired position data and to provide the desired position data to the first regulator with a predetermined time delay;
   a second feed forward control configured to receive the desired position data and to feed the desired position data forward to a third regulator at a lower level than the second regulator; and
   a second modeling filter configured to receive the desired position data and to provide the desired position data to the regulator with a second predetermined time delay.

2. The control system of claim 1, further comprising a memory, the modeling filter configured to store each of the desired position data in the memory and to read each of the desired position data from the memory the predetermined time delay after each of the desired position data is stored.

3. The control system of claim 2, wherein the modeling filter is further configured to generate additional data points based on the desired position data.

4. The control system of claim 3, wherein the additional data points are generated by linear interpolation between the desired position data.

5. The control system of claim 1, wherein the predetermined time delay is adjustable manually via an operator input device.

6. The control system of claim 1, further comprising a delay time adjuster configured to automatically adjust the predetermined time delay to eliminate overshoots in the movement of the object.

7. The control system of claim 1, wherein the first regulator comprises a position regulator.

8. The control system of claim 1, wherein the second regulator includes a speed regulator.

9. The control system of claim 1, wherein the modeling filter further comprises a low pass filter configured to filter the desired position data.

10. An apparatus for regulating the movement of an object based on desired position data using a cascaded regulator structure, comprising:
    means for speed regulating the movement of the object based on the desired position data;
    means for position regulating the movement of the object based on delayed desired position data which has been delayed by a predetermined time delay and for adjusting the predetermined time delay in steps finer than steps between the desired position data.

11. The apparatus of claim 10, further comprising:
    means for storing each of the desired position data in a memory;
    means for retrieving each of the desired position data from the memory the predetermined time delay after each of the desired position data is stored.

12. The apparatus of claim 10, wherein the means for adjusting includes means for interpolating the desired position data to generate additional data points.

13. The apparatus of claim 10, further comprising means for adjusting the predetermined time delay to eliminate overshoots in the movement of the object.

14. The apparatus of claim 10, further comprising means for low pass filtering the delayed desired position data.

15. A machine tool for controlling the movement of a tool with respect to a workpiece based on desired position data, comprising:
    a table configured to hold the workpiece;
    a first motor configured to move one of the table and the tool;
    a second motor configured to move one of the table and the tool;
    a controller configured to operate the first and second motors, wherein the controller includes:
    a first regulator configured to regulate the position of the first motor;
    a feed forward control configured to feed the desired position data forward to a second regulator at a lower level than the first regulator;
    a modeling filter configured to receive the desired position data and to provide the desired position data to the first regulator with a predetermined time delay;
    a third regulator configured to regulate the position of the second motor based on second desired position data;
    a second feed forward control configured to feed the second desired position data forward to a fourth regulator at a lower level than the third regulator; and
    a second modeling filter configured to receive the second desired position data and to provide the second desired position data to the third regulator with a predetermined time delay.

16. The machine tool of claim 15, further comprising a memory, the modeling filter configured to store each of the desired position data in the memory and to read each of the desired position data from the memory the predetermined time delay after each of the desired position data is stored.

17. The machine tool of claim 16, wherein the modeling filter is further configured to generate additional data points based on the desired position data.

18. The machine tool of claim 15, further comprising a delay time adjuster configured to automatically adjust the predetermined time delay to eliminate overshoots in the movement of the first motor.

19. The machine tool of claim 15, wherein the first regulator comprises a position regulator.

20. The machine tool of claim 15, wherein the second regulator includes a speed regulator.

21. The machine tool of claim 15, wherein the modeling filter further comprises a low pass filter configured to filter the desired position data.

22. A control system for controlling the movement of an object based on desired position data, comprising:
    a first regulator configured to regulate the position of the object;
    a feed forward control configured to feed the desired position data forward to a second regulator at a lower level than the first regulator; and
    a modeling filter configured to receive the desired position data and to provide the desired position data to the first regulator with a predetermined time delay, wherein the predetermined time delay is adjustable manually via an operator input device.

* * * * *